(No Model.)

C. L. ARQUES.
READING ATTACHMENT FOR METERS.

No. 604,953. Patented May 31, 1898.

WITNESSES:

INVENTOR

BY

ATTORNEYS.

UNITED STATES PATENT OFFICE.

CAMILO L. ARQUES, OF SAN JOSÉ, CALIFORNIA.

READING ATTACHMENT FOR METERS.

SPECIFICATION forming part of Letters Patent No. 604,953, dated May 31, 1898.

Application filed December 1, 1897. Serial No. 660,378. (No model.)

*To all whom it may concern:*

Be it known that I, CAMILO L. ARQUES, of San José, in the county of Santa Clara and State of California, have invented a new and Improved Reading Attachment for Meters, of which the following is a full, clear, and exact description.

The object of the invention is to provide a new and improved reading attachment for gas, electricity, or other meters, and arranged to enable a consumer or other person to quickly and conveniently read the amount of consumption of gas, electricity, &c., without requiring any further calculation.

The invention consists of novel features, as hereinafter more fully described, and pointed out in the claims.

Reference is to be had to the accompanying drawings, forming a part of this specification, in which similar characters of reference indicate corresponding parts in all the figures.

Figure 1:
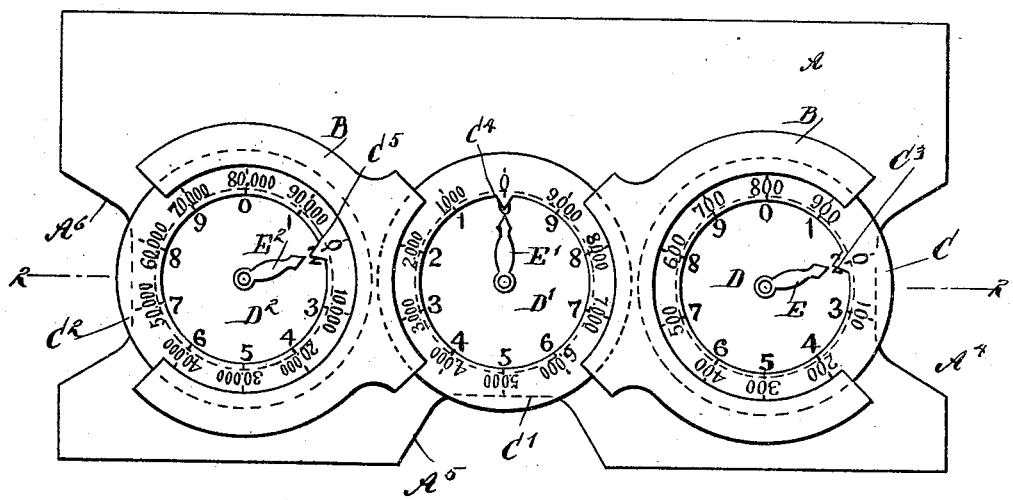
Figure 2:
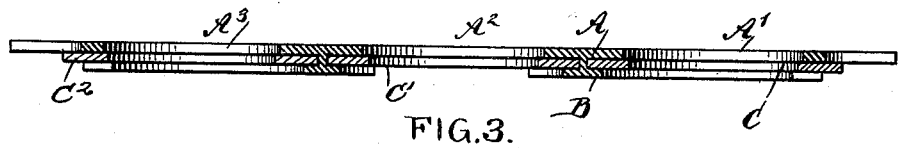
Figure 3:
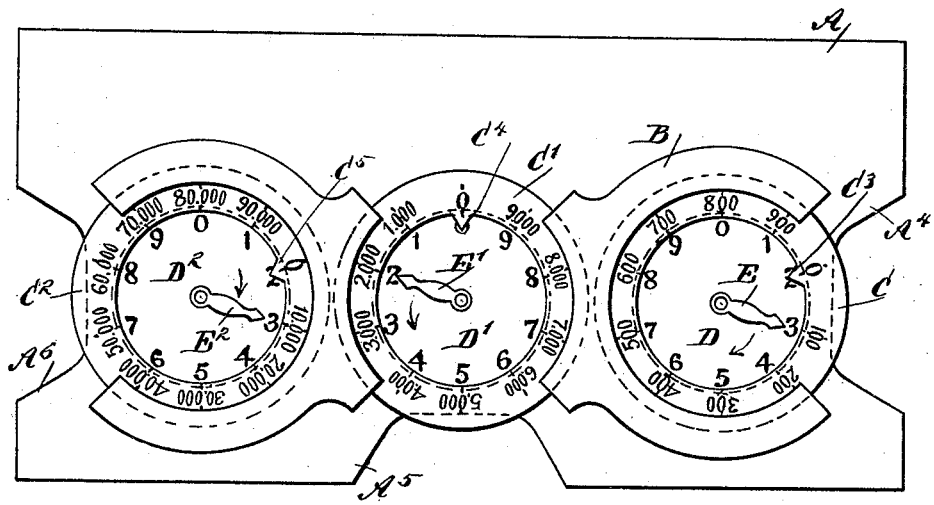

Figure 1 is a face view of the improvement as applied to the dial of the gas-meter. Fig. 2 is a sectional plan view of the improvement on the line 2 2 of Fig. 1, and Fig. 3 is a face view of the improvement as applied and with parts in a different position from the one shown in Fig. 1.

The improved reading attachment is mounted on a board or plate A, formed on its front face with guideways B for ring-shaped dials $C$ $C'$ $C^2$ to turn in, the dials being mounted over apertures $A'$ $A^2$ $A^3$, respectively, formed in the board or plate A and arranged to register with dials $D$ $D'$ $D^2$, respectively, of a gas or other meter provided with the usual hands or pointers $E$ $E'$ $E^2$, indicating on the dials $C$ $C'$ $C^2$ the amount of gas consumed.

The first ring-shaped dial C is provided with a graduation reading from "0" in hundreds to "1,000," and the second dial is provided with a graduation reading in thousands from "0" to "10,000." The third dial $C^2$ reads in ten thousands from "0" to "100,000."

The dials $C$ $C'$ $C^2$ are provided at their zero-marks with inwardly-extending points $C^3$ $C^4$ $C^5$, respectively, for placing the dials in proper position relatively to the pointers $E$ $E'$ $E^2$ at the time the consumption of gas begins. For instance, as shown in Fig. 1, the dial C has been turned until the point $C^3$ registers with the position of the pointer E on the dial D over the numeral "2" of the said dial. The second dial $C'$ has been turned until its zero-point $C^4$ registers with the pointer $E'$ over the zero on the dial $D'$, and the point $C^5$ of the dial $C^2$ registers with the pointer $E^2$ over the numeral "2" of the dial $D^2$. The attachment is now removed from the meter and stored away, with the dials remaining set, as described. Now as the consumption of gas or other fluid goes on the pointers $E$ $E'$ $E^2$ change positions in the usual manner, and when it is desired to read the amount of gas consumed up to a certain time after the dials $C$ $C'$ $C^2$ were set, as above described, then the operator again places the board A in position over the dials on the gas-meter, as indicated in Fig. 3. The pointers $E$ $E'$ $E^2$ now indicate at different points on the dials $C$ $C'$ $C^2$, showing, for instance, as indicated in Fig. 3, that the pointer E reads at "100," the pointer $E'$ at "2,000," and the pointer $E^2$ at "10,000" on the dials $C$ $C'$ $C^2$, thus indicating that twelve thousand one hundred cubic feet of gas has been consumed since the dials on the reading attachment were first set.

It is understood that the dials $D$ $D'$ $D^2$ and the pointers $E$ $E'$ $E^2$ give the amount of consumption in a regular way; but it requires considerable calculation to find the exact amount of gas consumed during a given period—that is, the pointers $E$ $E'$ $E^2$, as shown in Fig. 1, indicate on their dials "200," "0," and "20,000," respectively, making a total of twenty thousand two hundred cubic feet previous consumption, and the same pointers, as shown in Fig. 3, indicate on their dials "300," "2,000," and "30,000," respectively, making a total of thirty-two thousand three hundred cubic feet. The amount of gas consumed at the previous reading deducted from this amount gives twelve thousand one hundred cubic feet, which amount can be readily read on the attachment without resorting to the calculation referred to.

It is understood that after the operator has set the several dials $C$ $C'$ $C^2$, as above described, at the time of the beginning of the period during which the consumption of gas is to be observed, the attachment can then be stored away until the end of the period and then again applied to the dials of the gas-meter to permit of conveniently reading the amount of gas consumed during the period, as above described.

The device is very simple, can be cheaply manufactured, and can be readily manipulated by consumers to ascertain the amount of consumption of their meters.

In order to enable the operator to conveniently turn the dials $C$ $C'$ $C^2$ in their bearings, I provide the board A with cut-out portions $A^4$ $A^5$ $A^6$ to permit the operator to take hold of the portions of the ring-shaped dials and turn the same until the points $C^3$ $C^4$ $C^5$ register with the pointers $E$ $E'$ $E^2$, respectively, on the dials of the gas or other meters.

In case a large number of meters are operating under the same rate per thousand feet, such as are to be found in large cities, it would justify printing on the movable dial of the attachment not the cubic feet, but the equivalent in dollars and cents, thereby enabling the user to at once read the cost of the gas for a certain period.

Having thus fully described my invention, I claim as new and desire to secure by Letters Patent—

1. A reading attachment for meters provided with an apertured plate, and a ring-shaped dial mounted to turn on the plate concentric with the aperture in the plate, to permit of viewing the meter-dial, and setting the said ring-shaped dial according to the position of the pointer on the meter, substantially as shown and described.

2. A reading attachment for meters provided with a revoluble ring-shaped dial formed with a point or projection for registering with the pointer on the dial on which the attachment is to be used, said pointer coinciding with the zero-mark on the ring-shaped dial, substantially as shown and described.

3. A reading attachment for meters comprising a plate having apertures for viewing the dials on the meters on which the attachment is to be used, and ring-shaped dials mounted to turn on the said plate, concentric with the said apertures, each movable dial being formed with a numeral graduation from zero upward, substantially as shown and described.

4. A reading attachment for meters comprising a plate having apertures for viewing the dials on the meters on which the attachment is to be used, and ring-shaped dials mounted to turn on the said plate, concentric with the said apertures, each movable dial being formed with a numeral graduation from zero upward, and each movable dial being provided with a fixed point projecting inward from the zero-mark, substantially as shown and described.

CAMILO L. ARQUES.

Witnesses:
J. R. KOCHER,
J. J. KOCHER.